(12) United States Patent
Park

(10) Patent No.: US 7,896,046 B2
(45) Date of Patent: Mar. 1, 2011

(54) SUBSTRATE BONDING APPARATUS HAVING ALIGNMENT UNIT AND METHOD OF ALIGNING SUBSTRATES USING THE SAME

(75) Inventor: Si Hyun Park, Seongnam-si (KR)

(73) Assignee: ADP Engineering Co., Ltd., Gyeongki-do (KR)

( * ) Notice: Subject to any disclaimer, the term of this patent is extended or adjusted under 35 U.S.C. 154(b) by 740 days.

(21) Appl. No.: 11/892,629

(22) Filed: Aug. 24, 2007

(65) Prior Publication Data
US 2008/0047651 A1    Feb. 28, 2008

(30) Foreign Application Priority Data
Aug. 25, 2006  (KR) .................. 10-2006-0081141

(51) Int. Cl.
*B32B 41/00* (2006.01)

(52) U.S. Cl. ..... 156/358; 156/360; 156/580; 156/583.91

(58) Field of Classification Search .................. 156/358, 156/360, 580, 583.91; 100/269.12, 269.18, 100/269.19, 275, 244
See application file for complete search history.

(56) References Cited

U.S. PATENT DOCUMENTS

2003/0168176 A1* 9/2003 Byun et al. .................. 156/382
2004/0114095 A1* 6/2004 Lee et al. ..................... 349/187

* cited by examiner

*Primary Examiner* — George R Koch, III
(74) *Attorney, Agent, or Firm* — KED & Associates, LLP

(57) ABSTRACT

A substrate bonding apparatus includes a first chamber having a first surface plate where a first substrate is placed. A second chamber is disposed opposite to the first chamber. The second chamber has a second surface plate where a second substrate is placed. The second substrate is to be bonded to the first substrate. An alignment unit is installed in at least one of the first and second chambers. The alignment unit is capable of carrying out a six-degrees-of-freedom alignment between the first and second substrates. Thus, the substrates can be maintained parallel to each other, a spacing between the substrates can be automatically adjusted, and the substrates can be aligned in the X and Y axis directions.

26 Claims, 9 Drawing Sheets

SUBSTRATE BONDING APPARATUS HAVING ALIGNMENT UNIT AND METHOD OF ALIGNING SUBSTRATES USING THE SAME

BACKGROUND

1. Field

The present application discloses an apparatus for bonding substrates, and more particularly, a substrate bonding apparatus having an alignment unit enabling six-degrees-of-freedom alignment using a plurality of actuators. A method of aligning substrates using such an apparatus is also disclosed.

2. Background

A substrate bonding apparatus is used to bond two substrates of a flat panel display device to each other. Examples of such display devices include TFT-LCD panels, PDPs, OLEDs and the like. In the case of a TFT-LCD panel, a TFT substrate is bonded with a color filter substrate. Typically, the gap between the substrates is only a few micrometers. The TFT substrate is provided with multiple TFTs (thin film transistors) formed in a matrix form and the color filter substrate is formed with a color filter, a light shield film and the like.

The substrate bonding is carried out by pressing the two substrates together. For this purpose, the substrate bonding apparatus includes a first chamber and a second chamber which are positioned opposite each other. Each chamber is provided with a surface plate, on which a substrate can be held. One chamber then moves towards the other chamber while the substrates are maintained parallel to each other, and aligned in an X-axis and Y-axis directions. As the substrates are brought together, bonding of the two substrates is performed.

If the two surface plates are not properly aligned and held parallel to one another, an alignment error may occur during the substrate bonding process. Therefore, while the bonding process is being conducted, accurate alignment of the surface plates must be ensured.

In background art devices, surface plates are mounted in the first and second chambers, and the substrates are held on the surface plates. The relative positions of the two surface plates are adjustable, typically using one or more bolts. The surface plates are usually aligned manually using a leveler and a level-adjustment tool.

BRIEF DESCRIPTION OF THE DRAWINGS

The embodiments will be described in detail with reference to the following drawings, in which like reference numerals refer to like elements, and wherein.

DETAILED DESCRIPTION

Figure 1:
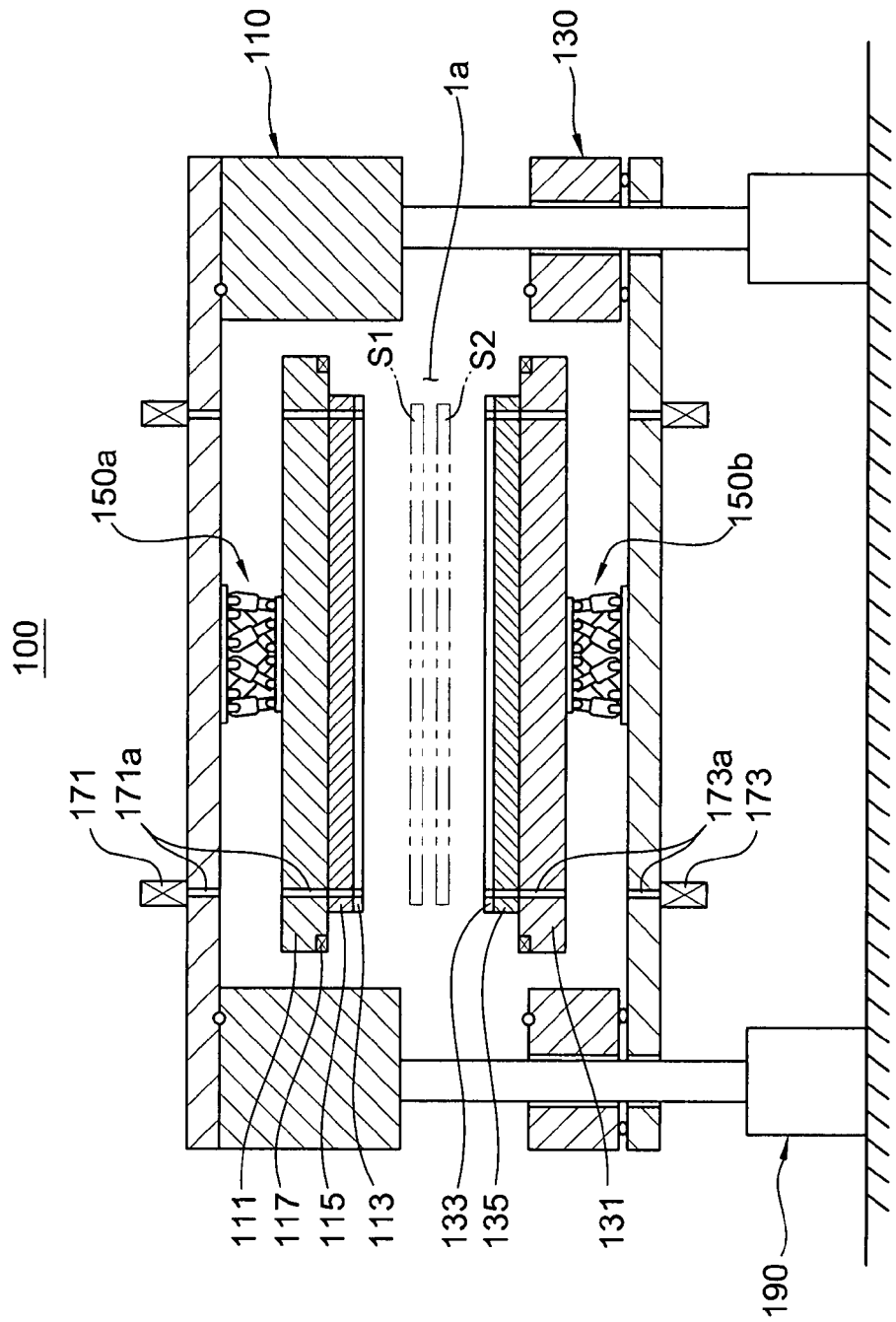
FIG. 1 is a schematic sectional view illustrating a first embodiment of a substrate bonding apparatus.

FIG. 1 is a sectional view schematically showing a first embodiment of a substrate bonding apparatus 100. The substrate bonding apparatus includes a first chamber 110, a second chamber 130 and an alignment unit 150. Formed between the first chamber 110 and the second chamber 130 is a processing space 1a where a first substrate S1 and a second substrate S2 are bonded to each other. The first and second substrates S1 and S2 may be a TFT substrate and a color filter substrate, or other substrates that are to be bonded to each other with a high degree of alignment precision.

The first chamber 110 is provided with a first surface plate 111 upon which the first substrate S1 is held. The first surface plate 111 is provided with a first chuck 113 for holding the first substrate S1. The first chuck may be an electrostatic chuck which is capable of holding a substrate via the application of an electric charge which creates an electrostatic holding force. Installed between the first surface plate 111 and the first chuck 113 is a first chuck plate 115 for mounting the first chuck 113 to the first surface plate 111.

The second chamber 130 is provided with a second surface plate 131 upon which the second substrate S2 is held. The second surface plate 131 is provided with a second chuck 133 for holding the second substrate S2. Installed between the second surface plate 131 and the second chuck 133 is a second chuck plate 135 for mounting the second chuck 133 to the second surface plate 131.

Either or both of the first and second surface plates 111 and 131 is provided with one or more spacing sensors 117 for measuring a spacing between the first surface plate 111 and the second surface plate 131. Preferably, multiple spacing sensors 117 are installed at different locations on one or both of the surface plates. For example, a spacing sensor 117 may be installed at each of the four corners of the first surface plate 111 such that each sensor 117 is directed at a corresponding corner of the second surface plate 131. The spacing sensors 117 may employ a non-contact sensor such as a laser sensor or an ultrasonic sensor.

The first and second chucks 113 and 133 may be electrostatic chucks (ESCs) which can hold the first and second substrates S1 and S2 using an electrostatic force. The electrostatic chucks are configured in such a way that one or more electrodes are disposed inside of an insulator body. Electric power is applied to these electrodes to generate an electrostatic force. That is, the substrate surface exhibits an artificial polarity due to a dielectric polarization, thereby generating the electrostatic holding force.

Installed at the upper side of the first chamber 110 are one or more cameras 171 for viewing alignment marks (not shown) formed on the first and second substrates S1 and S2 (hereinafter, referred to as "two substrates"). At the lower side of the second chamber 130, one or more corresponding illuminator devices 173 may be provided for illuminating the alignment marks so that the cameras 171 can obtain a clear image of the alignment marks. In addition, imaging holes 171a are formed so that they pass through the first chamber 110 and the first chuck 113, and illumination holes 173a may be formed so that they pass through the second chamber 130 and the second chuck 113.

The first chamber 110 is installed so as to be supported by a lift driver unit 190. The lift driver unit 190 operates such that when two substrates S1 and S2 are to be bonded to one another, the first chamber 110 descends into the processing space 1a. After the two substrates S1 and S2 are bonded together, the first chamber 110 ascends to open the processing space 1a, and thus facilitate transportation of the two substrates S1 and S2 into and out of the apparatus.

Although not illustrated, the first chamber 110 and the second chamber 130 may be provided with one or more exhaust pumps (not shown) and gas supply pumps (not shown). Once the first and second chambers have been brought together, the exhaust pump is used to evacuate the processing space 1a to generate a vacuum state while bonding the two substrates S1 and S2 together.

Typically, once the processing space has been evacuated, the first and substrates are brought together. Then, the gas supply pump is used to supplying a processing gas into the processing space 1a. The pressure of the processing gas pushes the two substrates S1 and S2 against each other to facilitate bonding.

In addition, the first and second chambers 110 and 130 may be provided with a lift pin (not shown) and a lift driver unit (not shown) for guiding the two substrates S1 and S2 as they are introduced into the processing space 1a, and are attached to the first chuck 113 and the second chuck 133.

A first surface plate alignment unit 150a is provided between the first chamber 110 and the first surface plate 111. A second surface plate alignment unit 150b is provided between the second chamber 130 and the second surface plate 131. The first surface plate alignment unit 150a and the second surface plate alignment unit 150b are configured so as to be capable of a six-degrees-of-freedom alignment procedure. Although the embodiment shown in FIG. 1 has both a first and a second surface plate alignment unit, in alternate embodiments, only one alignment unit may be employed.

Hereafter, for the purposes of convenience of explanation and understanding, an explanation will be provided with respect to the second surface plate alignment unit 150b. It should be noted, however, that the first surface alignment unit 150a is basically identical to the second surface plate alignment unit 150b and would operate in the same general manner.

Figure 2:
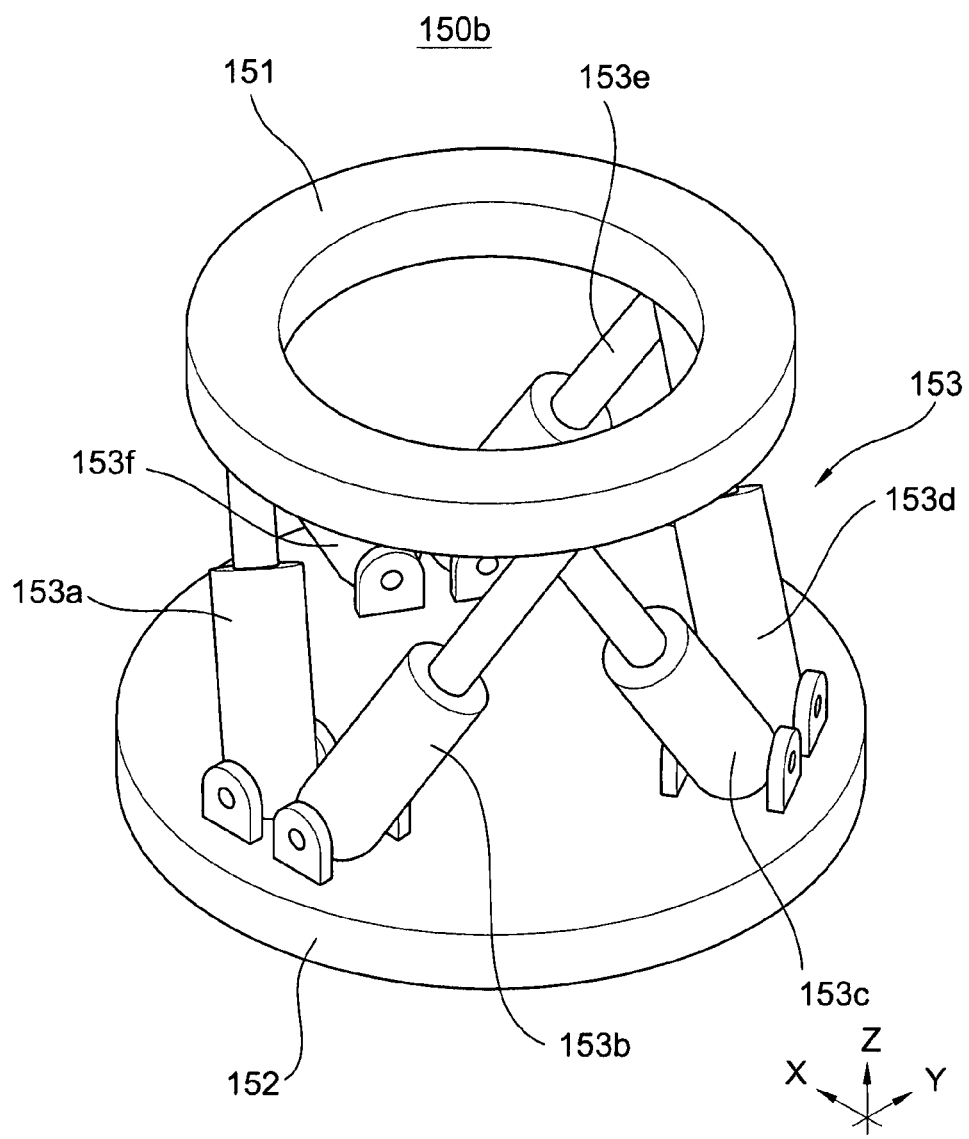
FIG. 2 is an enlarged perspective view illustrating an alignment unit of the substrate bonding apparatus of FIG. 1.

FIG. 2 is an enlarged perspective view showing an alignment unit which could be used as the second surface plate alignment unit in the first embodiment shown in FIG. 1. The second surface plate alignment unit 150b includes a connector plate 151, a support plate 152 and a plurality of actuators 153. When installed in the substrate bonding apparatus, the connector plate 151 is attached to the bottom of the second surface plate 131, and the support plate 152 is attached to the inner side of the second chamber 130. The actuators 153 are provided between the connector plate 151 and the support plate 152. The upper sides of each actuator are linked to the connector plate and the lower sides thereof are linked to the support plate 152.

The actuators may be coupled to the connector plate 151 and the support plate 152 respectively by means of universal joints, or simple pivot joints. In addition, in alternate embodiments, the support plate and/or the connector plate could be eliminated, and the actuators could be attached directly to the second chamber 130 and the second surface plate 131.

A first actuator 153a and a second actuator 153b are disposed and installed in a pair so as to form a "V"-shape. In addition, a third actuator 153c and a fourth actuator 153d are disposed in a pair to form a "V"-shape. Furthermore, a fifth actuator 153e and a sixth actuator 153f are disposed in a pair in the form of "V". As a result of this arrangement, the second surface plate alignment unit 150b is capable of a six-degrees-of-freedom alignment, i.e., X, Y, Z-axis direction, and roll, pitch and yaw aligning operations.

In the second surface plate alignment unit 150b, the X-axis direction aligning operation is carried out by varying the amount of extension/retraction of the various actuators 153. In order to move the connector plate in the positive X axis direction, the sixth actuator 153f is minimally extended, and the first and fifth actuators 153a and 153e are extended greater than the sixth actuator 153f. The second and fourth actuators 153b and 153d are extended greater than the first and fifth actuators 153a and 153e, and the third actuator 153c is maximally extended. In this way, the second surface plate 131 moves along the positive X-axis direction, while still maintaining a parallel alignment between the second surface plate and the first surface plate. Conversely, if the multiple actuators 153 are moved in opposite ways to those described above (retracted), the second surface plate 131 is moved in the negative X-axis direction.

The roll alignment, i.e., the rotation about the X-axis, is performed in such a way that, with the third and sixth actuators 153c and 153f fixed, the first and second actuators 153a and 153b are extended, and the fourth and fifth actuators 153d and 153e are contracted, or vice versa.

The Y-axis direction aligning operation is carried out as follows. The fourth actuator 153d is minimally extended, and then the third and fifth actuators 153c and 153e are extended greater than the fourth actuator 153d. The second and sixth actuators 153b and 153f are extended greater than the third and fifth actuators 153c and 153e, and the first actuator 153a is maximally extended. In this way, the second surface plate 131 moves along the positive Y-axis direction in the figure while maintaining a parallel alignment between the first and second surface plates. If the multiple actuators 153 are extended in opposite ways to those described above (retracted), the second surface plate 131 would move in the negative Y-axis direction.

The pitch alignment, i.e., rotation about the Y-axis, is performed in such a way that, with the first and fourth actuators 153a and 153d fixed, the fifth and sixth actuators 153e and 153f are extended and the second and third actuators 153b and 153c are contracted, or vice versa.

The Z-axis direction aligning, which is an operation of causing the second surface plate 131 to ascend or descend, is performed by extending or shrinking all of the plurality of actuators 153. The yaw alignment, rotation about the Z axis, is obtained in a way that the actuators 153 are extended or shrank all together with a predetermined magnitude.

Using the above six-degrees-of-freedom alignment, for the purposes of accomplishing a more accurate alignment of the second surface plate 131, two or more directions of alignment can be carried out simultaneously and interlockingly. In this way, more rapid and accurate alignment between the first and second surface plates 111 and 131 can be achieved in an efficient manner.

Figure 3:
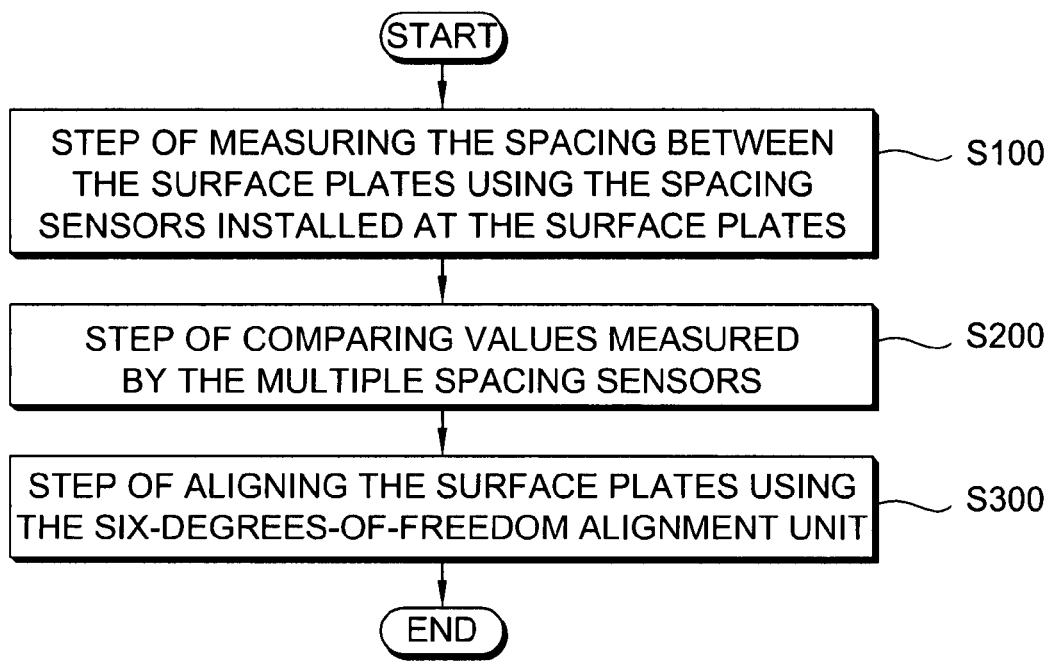
FIG. 3 is a flow chart illustrating a substrate aligning method.

Hereafter, a method of aligning the substrates will be explained with reference to FIG. 3. Referring to FIG. 3, before starting a bonding process, in step S100, the spacing sensors 117 measure a spacing between various locations on the first and second surface plates 111 and 131.

Once the spacing between the first and second surface plates 111 and 131 is measured, in step S200, a control unit (not shown) in the bonding apparatus 100 compares the values detected by the different spacing sensors 117. If the spacing sensors indicate that all portions of the first and second surface plates are the same distance apart, the control unit (not shown) determines that the first and second surface plates 111 and 131 are aligned.

If the control unit determines that the spacing between the various portions of the first and second surface plates is not the same, in step S300 the control unit (not shown) operates the alignment unit 150 until all the distance values measured from all the spacing sensors 117 are the same.

In an alternate embodiment, a predetermined spacing value between the plates may be input. Then, the first and second surface plate alignment units 150a and 150b are operated until all the spacing sensors detect the desired input spacing value. In this way, the first and second surface plates 111 and 131, which are installed in the first and second chambers 110 and 130 respectively, can be adjusted so that the first and second surface plates are parallel.

In addition to using the input from the spacing sensors, the control unit may use input from one or more cameras 171 to ensure that the two substrates S1 and S2 mounted on the first and second surface plates are properly aligned in the X and Y axis directions. That is, aligning marks formed on the two substrates S1 and S2 can be used to carry out an alignment of the substrates in the X- and/or Y-axis directions.

In the embodiment shown in FIG. 1, a plurality of cameras 171 are located on the top of the substrate bonding apparatus, and a corresponding plurality of illumination devices 173 are located on the bottom of the bonding apparatus. In alternate embodiments, the locations of the cameras and illumination devices may be reversed. In addition, some cameras may be located on the top, and some may be located on the bottom. In still other embodiments, no illumination devices may be used.

In order to align the first and second substrates, an image of alignment marks on the first and second substrates would by captured by the camera. Such alignment marks are typically in the form of a cross or X. If the marks on both substrates are perfectly aligned, the image would only show one cross or X. In that instance, there would be no need to adjust the position of either substrate.

On the other hand, if the alignment marks of both substrates were visible in the image captured by one of the cameras, this would indicate that the two substrates are not properly aligned. In this instance, one or both of the substrates would be moved in the X aixs and/or Y axis directions by one or more of the aligning units until the alignment marks do coincide, and it appears as though there is only one alignment mark.

Of course, in alternate embodiments, the alignment marks could take different forms which also indicate how the substrates must be moved with respect to each other to achieve proper alignment.

In still other embodiments, when no aligning marks are visible to the cameras 171, the cameras 171 could still be used to align the first and second spacing plates in the X and Y axis directions by simply measuring the amount of light received at the cameras 171 from the illumination devices 173. That is, in case where the first and second surface plates 111 and 131 are not properly aligned in the X- and Y-axis directions, different cameras 171 will receive different intensities of light. For example, some cameras 171 may receive a relatively large amount of light since the illumination holes 173a and corresponding photographing holes 171a are only slightly misaligned. Other cameras 171 would receive a relatively small amount of light since the illumination holes 173a and corresponding photographing holes 171a are more greatly misaligned. In this case, the light intensities detected by the respective cameras can be compared, and the actuators 153 can be controlled until the light received by all the cameras comes to within a critical value. As a result, the first and second surface plates will be properly aligned in the X and Y axis directions.

The cameras 171 may employ a charge-coupled device (CCD) or a complementary metal oxide semiconductor (CMOS) image sensor. In the CCD and CMOS image sensors, the light intensity can be measured by computing the number of turned-on pixels. In other embodiments, the cameras may be replaced with simple light sensors capable of detecting the relative amount of light being received by the sensors.

Other embodiments will now be explained with reference to the accompanying drawings. In the description that follows, components in the other embodiments that are similar to those in the first embodiment are denoted by the same terminologies, and details thereof will not be repeated.

Figure 4:
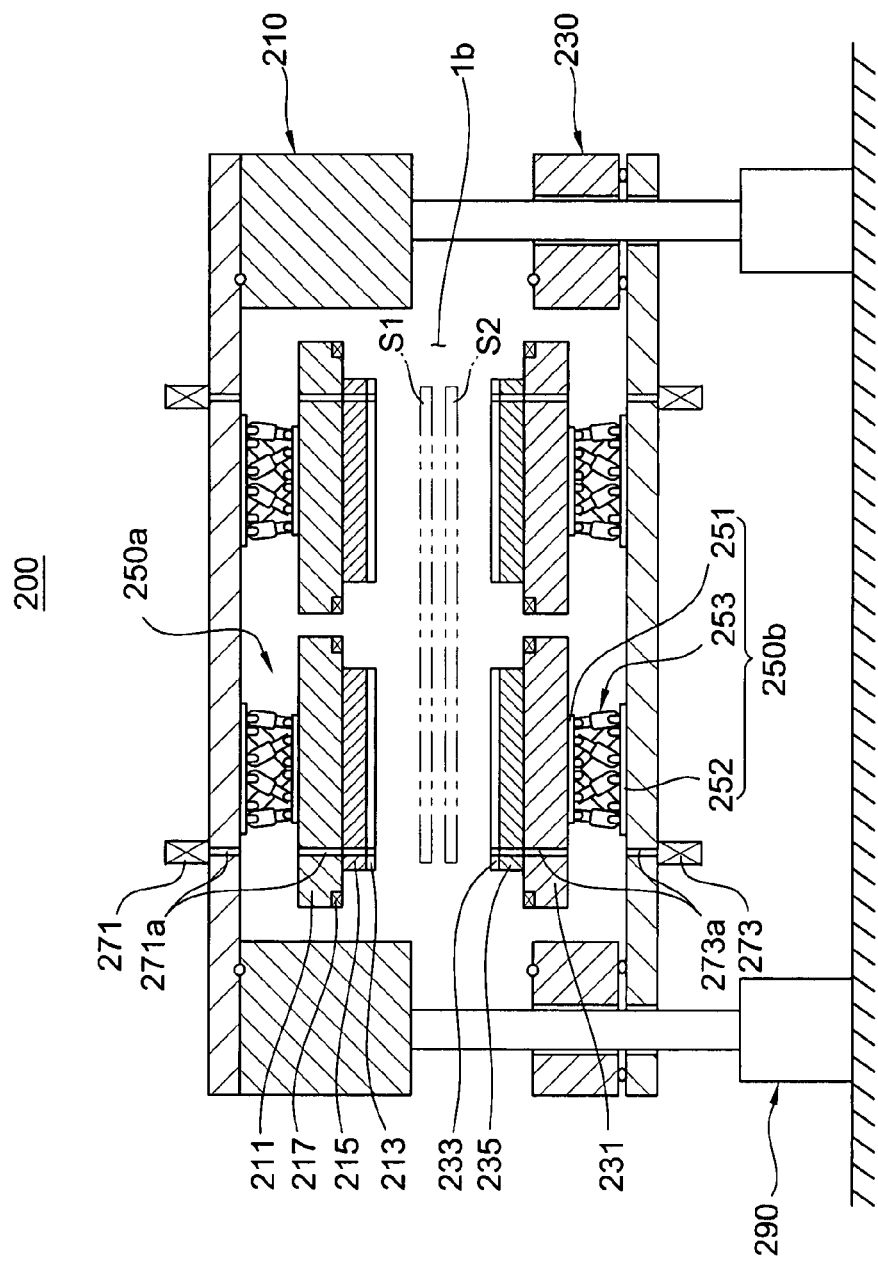
FIG. 4 is a sectional view schematically showing a second embodiment of a substrate bonding apparatus.

FIG. 4 is a sectional view schematically illustrating a second embodiment of a substrate bonding apparatus 200. Referring to FIG. 4, the substrate bonding apparatus 200 includes a first chamber 210 and a second chamber 230, which are provided with multiple first surface plates 211 and multiple second surface plates 231, respectively. Accordingly, a plurality of first surface plate alignment units 250a are provided between the first chamber 210 and the respective first surface plates 211, and a plurality of second surface plate alignment units 250b are provided between the second chamber 230 and the respective second surface plates 231. In addition, each individual first surface plate 211 (or each individual second surface plate 231) is provided with multiple spacing sensors 217.

The multiple spacing sensors 217, which are installed on the first surface plates 211 (or the second surface plates 231), measure and compare the spacing values between the first and second surface plates. According to the measurement and comparison results, the first surface plate alignment units 250a and the second surface plate alignment units 250b perform the six-degrees-of-freedom alignment with respect to the first and second surface plates 211 and 231, to thereby adjust the plates so that they are parallel, and have a desired spacing therebetween.

Figure 5:
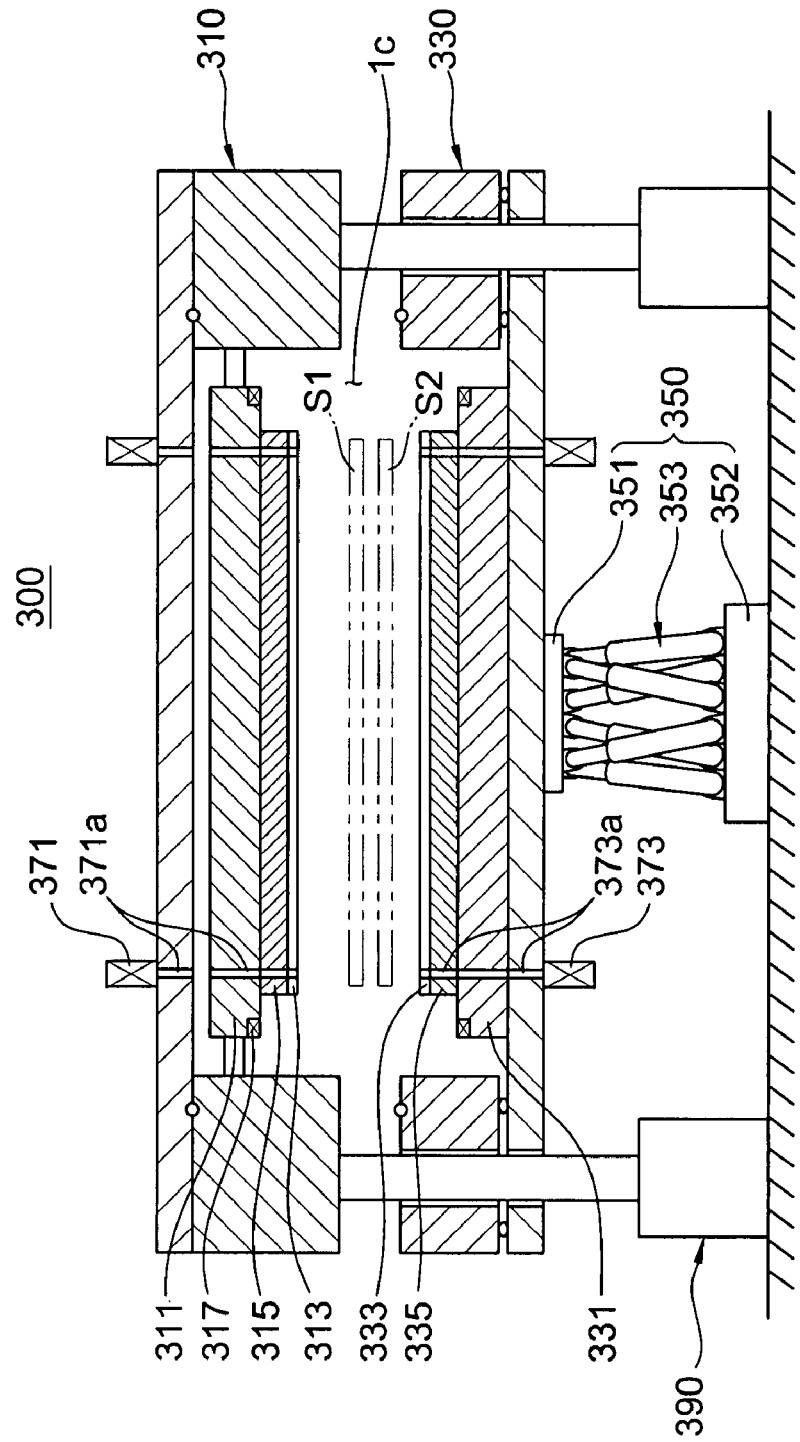
FIG. 5 is a sectional view schematically showing a third embodiment of a substrate bonding apparatus.

FIG. 5 is a sectional view schematically showing a third embodiment of a substrate bonding apparatus 300. Referring to FIG. 5, an alignment unit 350 is provided under the second chamber 330, which is placed below the first chamber 310. The alignment unit 350 is installed so as to support the second chamber 330, in such a way that the connector plate 351 of the alignment unit 350 is attached to the bottom of the second chamber 330 and the support plate 352 is attached to the floor where the substrate bonding apparatus 300 is installed.

The multiple spacing sensors 317, which are installed ot the first surface plate 311 (or the second surface plate 331), measure and compare the spacing values between the first and second surface plates. According to the measurement and comparison results, the alignment unit 350 performs the six-degrees-of-freedom alignment procedure to ensure that the first and second surface plates are parallel and have a required spacing therebetween. In this embodiment, the lift driver unit 390 may be omitted. Instead, the second chamber 330 may be made to ascend or descend by means of the alignment unit 350, thereby sealing or opening the processing space 1c.

Figure 6:
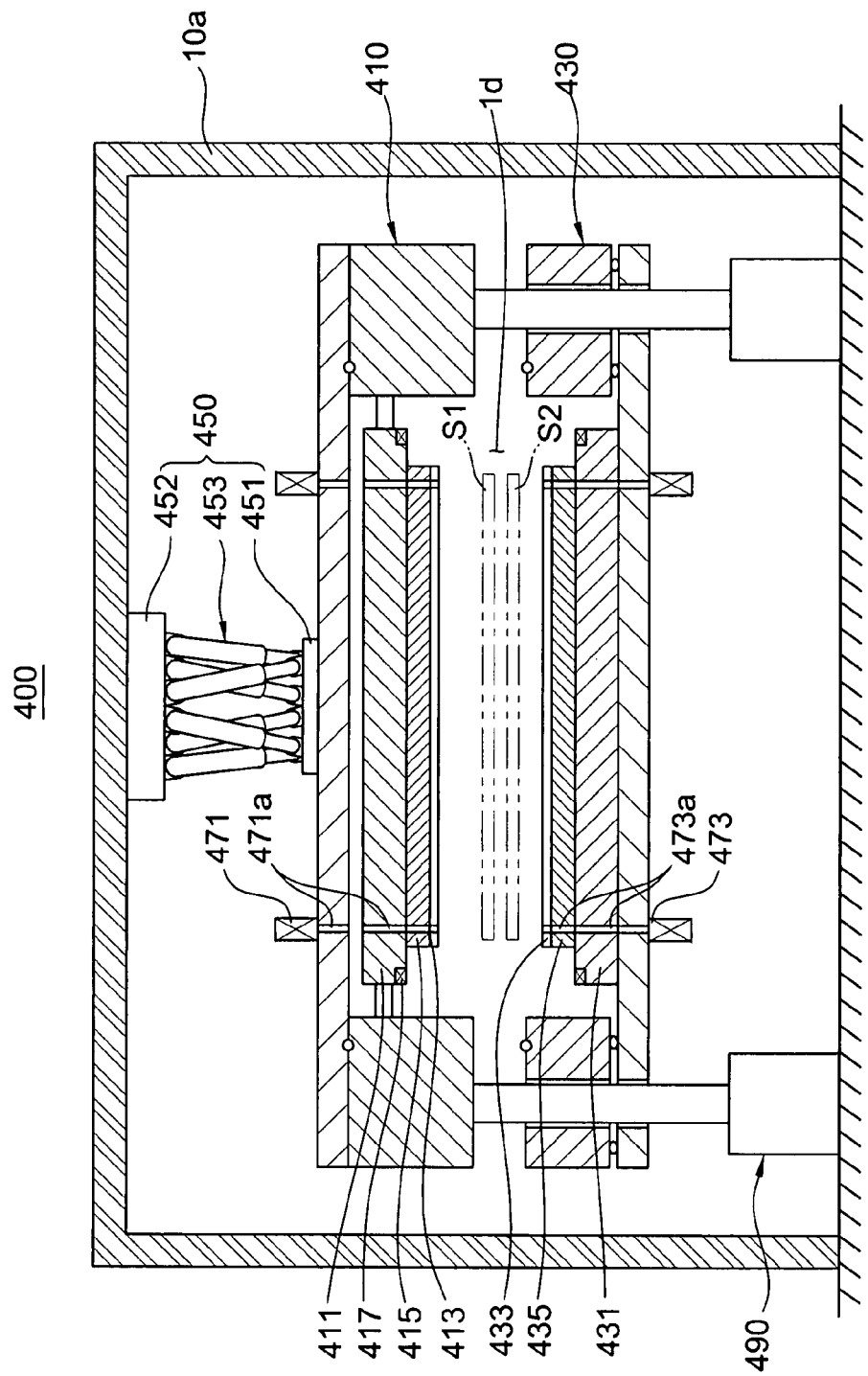
FIG. 6 is a sectional view schematically showing a fourth embodiment of a substrate bonding apparatus.

FIG. 6 is a sectional view schematically showing fourth embodiment of a substrate bonding apparatus 400. Referring to FIG. 6, a base frame 10a is installed around the first and second chambers 410 and 430. An alignment unit 450 is provided above the first chamber 410, which is located above the second chamber 430. The alignment unit 450 is installed at the base frame 10a so as to support the first chamber, in such a manner that the connector plate 451 of the alignment unit 450 is coupled to the top of the first chamber 410 and the support plate 452 thereof is coupled to the inner side of the base frame 10a.

The multiple spacing sensors 417, which are installed on the first surface plate 411 (or the second surface plate 431), measure and compare the spacing values between the first and second surface plates. According to the measurement and comparison results, the alignment unit 450 performs the six-degrees-of-freedom alignment procedure to ensure that the first and second surface plates are parallel and have a desired spacing therebetween.

In the fourth embodiment, the lift driver unit 490 may be omitted. Instead, the first chamber 410 may be made to ascend or descend by means of the alignment unit 450, thereby sealing or opening the processing space 1d.

Figure 7:
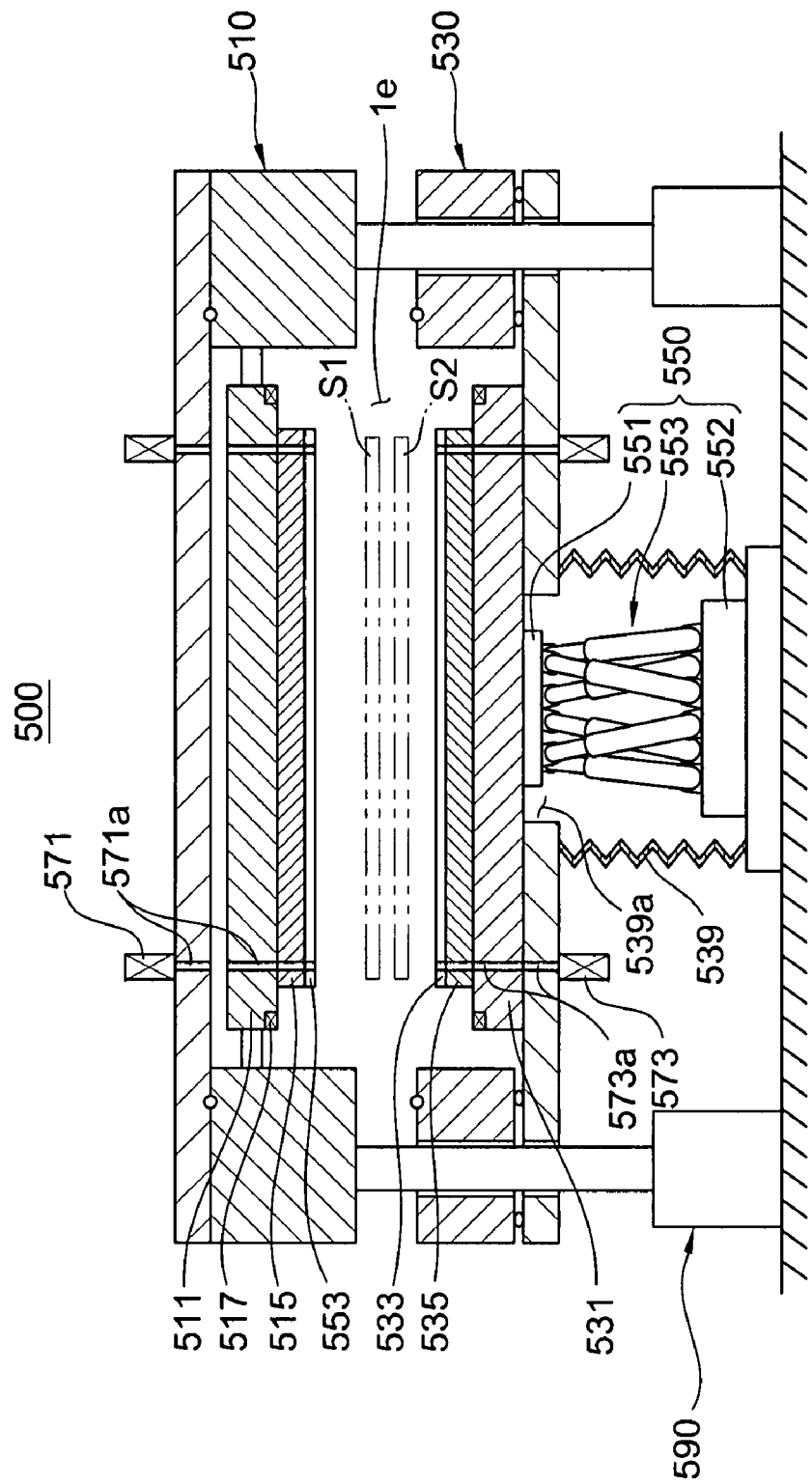
FIG. 7 is a sectional view schematically showing a fifth embodiment of a substrate bonding apparatus.

FIG. 7 is a sectional view schematically illustrating a fifth embodiment of a substrate bonding apparatus 500. Referring to FIG. 7, an alignment unit 550 is provided under the second chamber 530, which is placed below the first chamber 510. The alignment unit 550 is installed in such a way that the connector plate 551 of the alignment unit 550 is attached to the bottom of the second surface plate 531, while multiple actuators 553 pass through the second chamber 530. The support plate 552 thereof is attached to the floor where the substrate bonding apparatus 500 is installed.

The multiple spacing sensors 517, which are installed on the first surface plate 511 (or the second surface plate 531), measure and compare the spacing values between the first and second surface plates. According to the measurement and comparison results, the alignment unit 550 performs the six-degrees-of-freedom alignment procedure to ensure that the first and second surface plates are parallel and have a desired spacing therebetween.

The substrate bonding apparatus 500 of fifth embodiment is provided with a bellows 539 for sealing the multiple actuators 553 and the through-opening 539a of the second chamber 530, thereby maintaining air-tightness of the processing space 1e during the process for bonding two substrates S1 and S2. The bellows 539 is configured so as to expand or contract during the up and down movements that would occur during the six-degrees-of-freedom alignment process, and as the second chamber ascends and descends relative to the first chamber.

Figure 8:
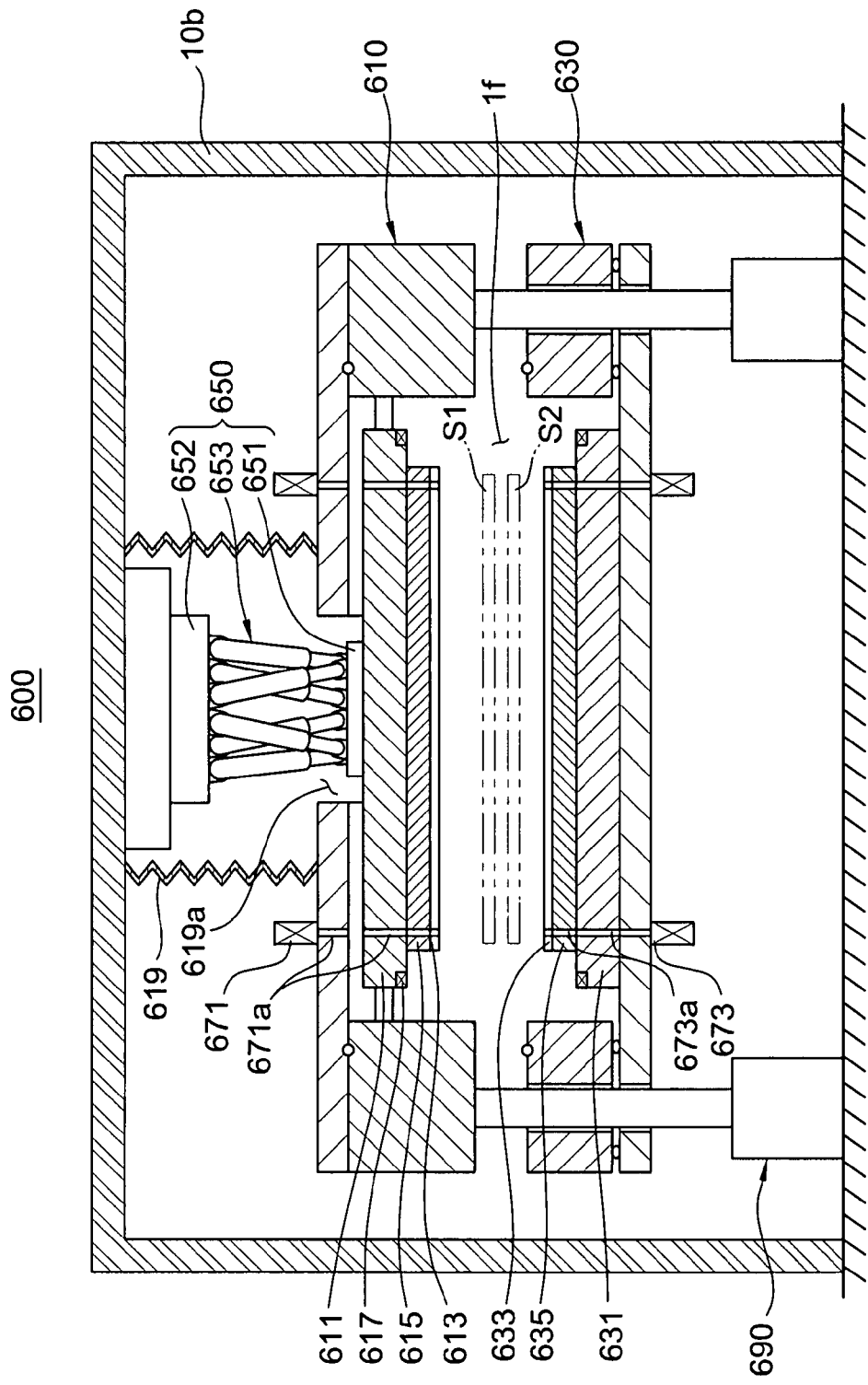
FIG. 8 is a sectional view schematically showing a sixth embodiment of a substrate bonding apparatus.

FIG. 8 is a sectional view schematically illustrating a sixth embodiment of a substrate bonding apparatus 600. Referring to FIG. 8, a base frame 10b is installed around the first and second chambers 610 and 630. An alignment unit 650 is provided above the first chamber 610, which is placed above the second chamber 630. The alignment unit 650 is installed in such a way that the connector plate 651 of the alignment unit 650 is attached to the top of the first surface plate 611 while multiple actuators 653 pass through the first chamber 630. The support plate 652 thereof is attached to the inner side of the base frame 10b.

The multiple spacing sensors 617, which are installed on the first surface plate 611 (or the second surface plate 631), measure and compare the spacing values between the first and second surface plates. According to the measurement and comparison results, the alignment unit 650 performs the six-degrees-of-freedom alignment with respect to the first surface plate 611, thereby ensuring that the first and second surface plates are parallel, and that a desired spacing is maintained therebetween.

The substrate bonding apparatus 600 of sixth embodiment is provided with a bellows 619 for sealing the multiple actuators 653 and the through-opening 619a of the first chamber 610, thereby maintaining air-tightness of the processing space 1f during the process for bonding two substrates S1 and S2. The bellows 619 is configured so as to expand or contract during the up and down movements that occur during the six-degrees-of-freedom alignment process, and as the first chamber ascends and descends.

Figure 9:
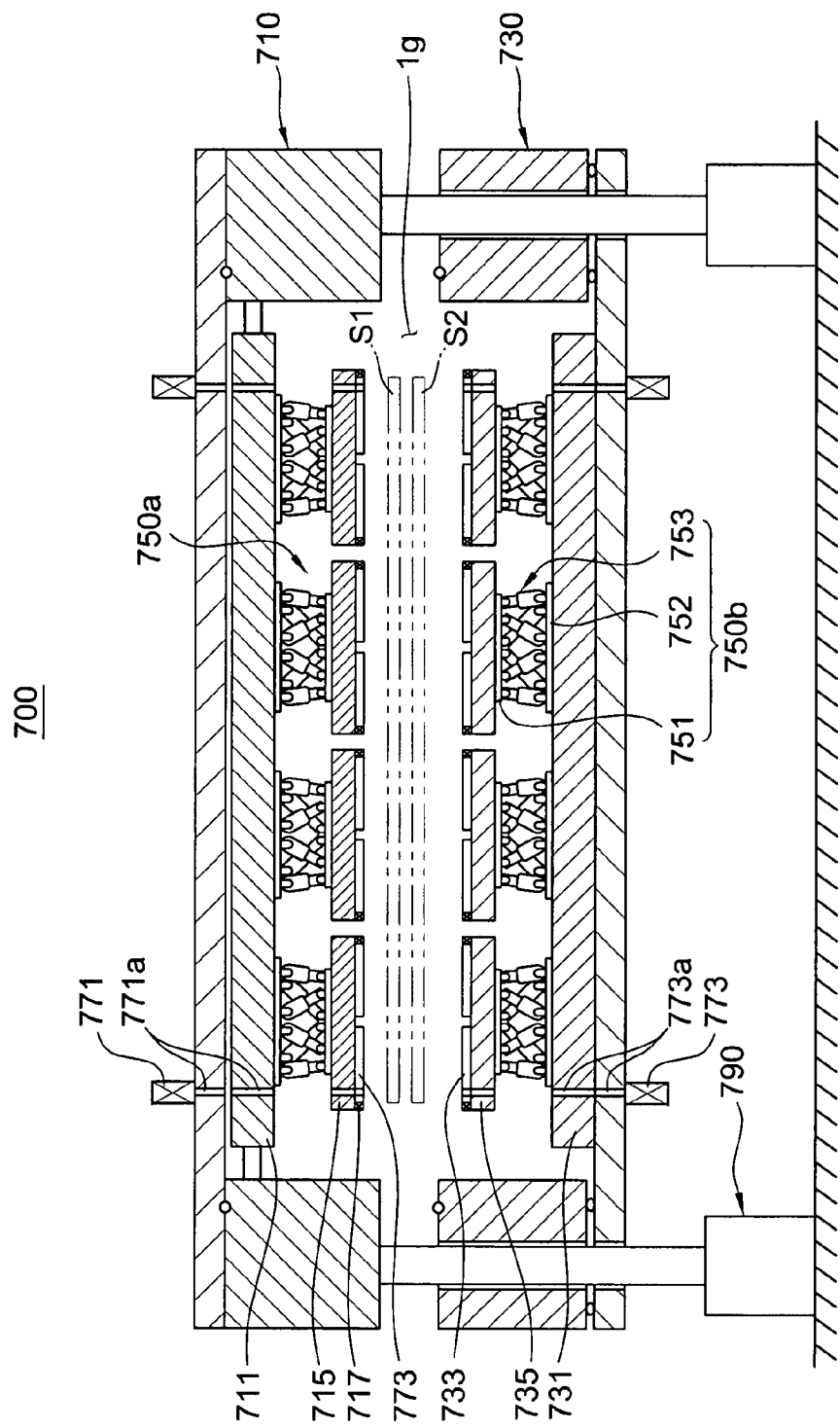
FIG. 9 is a sectional view schematically showing a seventh embodiment of a substrate bonding apparatus.

FIG. 9 is a sectional view schematically illustrating a seventh embodiment of a substrate bonding apparatus 700. Referring to FIG. 9, a plurality of first chuck plate alignment units 750a are provided between the first surface plate 711 and corresponding first chuck plates 715. A plurality of second chuck plate alignment units 750b are installed between the second surface plate 731 and corresponding ones of the second chuck plates 737. As an alternative embodiment, more similar to the one shown in FIG. 1, only one alignment unit may be provided between each surface plate, and a corresponding single chuck unit.

Hereafter, for the purposes of convenient explanation and understanding, the second chuck plate alignment unit 750b will be explained. It should be understood that the first chuck plate alignment unit 750a is basically identical to the second chuck plate alignment unit, and would operate in the same fashion.

The second surface plate 731 is a single plate. The second chuck plate 735 may be divided into plural second chuck plates, as shown in FIG. 9. Similarly, a plurality of second chucks 733 are provided, each of which is mounted on a corresponding second chuck plate 735. Accordingly, a plurality of second chuck plate alignment units 750b are provided between the second surface plate 731 and corresponding ones of the second chuck plates 735. The connector plate 751 of each alignment unit is coupled to the bottom of one of the second chuck plates 735, and the support plate 752 is attached to the second surface plate 731.

Multiple spacing sensors 717 may be installed at any one of the first and second chucks 713 and 733, or on the chuck plates 715 and 735. The multiple spacing sensors 717, measure and compare the spacing values. According to the measurement and comparison results, the second chuck plate alignment units 750b perform the six-degrees-of-freedom alignment with respect to each of the second chuck plates 735, thereby ensuring that the first and second chucks are parallel and have a desired spacing therebetween.

As described above, a substrate bonding apparatus using an alignment unit capable of a six-degrees-of-freedom alignment, enables the apparatus to efficiently achieve a quick and precise alignment of two substrates. The alignment unit may be modified in part and installed in different ways. In addition, the individual actuators of the alignment unit may be driven pneumatically, hydraulically, through an electromagnetic operation by electromagnetic force, or through a mechanical operation using a ball screw and motor, or by other means.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various variations and modifications are possible in the component parts and/or arrangements which would fall within the scope of the disclosure, the drawings and the appended claims. In addition to variations and modifications in the component parts and/or arrangements, alternative uses will also be apparent to those skilled in the art.

What is claimed is:

1. An apparatus for bonding substrates, comprising:
a first chamber having a first surface plate upon which a first substrate can be mounted;
a second chamber mounted opposite the first chamber, the second chamber having a second surface plate upon which a second substrate can be mounted; and
an alignment unit installed in at least one of the first chamber and the second chamber, wherein the alignment unit can adjust a position of a surface plate of the chamber in which it is mounted via a six-degrees-of-freedom alignment procedure, wherein the alignment unit comprises:
a connector plate coupled to a surface plate of the chamber in which it is mounted, wherein the connector plate can be displaced during the six-degrees-of-freedom alignment procedure,
a support plate, and
a plurality of actuators installed between the connector plate and the support plate, wherein a first end of each of the actuators is pivotally coupled to the connector plate, and wherein a second end of each of the actuators is pivotally coupled to the support plate.

2. The apparatus of claim 1, wherein the plurality of actuators comprise six actuators installed at different locations around the connector plate and support plate.

3. The apparatus of claim 2, wherein the six actuators are installed in three pairs, and wherein each pair of actuators forms a V shape.

4. The apparatus of claim 1, further comprising a controller that controls movements of the six actuators.

5. The apparatus of claim 4, wherein the controller controls the six actuators so that the surface plate coupled to the connector plate is aligned such that it is parallel with the other surface plate of the apparatus.

6. The apparatus of claim 4, further comprising a plurality of distance sensors that are mounted on one of the first surface plate and the second surface plate, wherein the distance sensors detect a distance between corresponding points on the first and second surface plates.

7. The apparatus of claim 6, wherein the distance sensors are coupled to the controller, and wherein the controller uses information provided by the distance sensors to control movements of the actuators to cause the first and second surface plates to be aligned with one another.

8. The apparatus of claim 7, further comprising at least one camera mounted on the apparatus such that the camera can capture an image of alignment marks of substrates mounted on the first and second surface plates, and wherein the controller uses an image from the at least one camera to control the actuators to cause the first and second surface plates to be aligned in X axis and Y axis directions.

9. The apparatus of claim 1, wherein the alignment unit is located between the first chamber and the first surface plate, wherein the connector plate is coupled to the first surface plate, and wherein the support plate is coupled to the first chamber.

10. The apparatus of claim 1, wherein the alignment unit is located between the second chamber and the second surface plate, wherein the connector plate is coupled to the second surface plate, and wherein the support plate is coupled to the second chamber.

11. The apparatus of claim 1, wherein the first surface plate comprises a plurality of first surface plates, wherein each actuator is located between the first chamber and a corresponding one of the first surface plates.

12. The apparatus of claim 11, wherein the second surface plate comprises a plurality of second surface plates, and wherein an alignment unit is located between the second chamber and a corresponding one of each of the second surface plates.

13. The apparatus of claim 12, wherein a plurality of distance sensors are mounted on each of the plurality of first surface plates, and wherein the distance sensors detect a distance between corresponding parts of the first and second surface plates.

14. An apparatus for bonding substrates, comprising:
a first chamber having a first surface plate upon which a first substrate can be mounted;
a second chamber mounted opposite the first chamber, the second chamber having a second surface plate upon which a second substrate can be mounted; and
an alignment unit installed adjacent at least one of the first chamber and the second chamber, wherein the alignment unit can adjust a position of a surface plate of the chamber to which it is adjacent via a six-degrees-of-freedom alignment procedure, wherein the alignment unit comprises:
a connector plate coupled to a surface plate of the chamber in which it is mounted, wherein the connector plate can be displaced during the six-degrees-of-freedom alignment procedure,
a support plate, and
a plurality of actuators installed between the connector plate and the support plate, wherein a first end of each of the actuators is pivotally coupled to the connector plate, and wherein a second end of each of the actuators is pivotally coupled to the support plate.

15. The apparatus of claim 14, wherein the alignment unit supports the first chamber, and wherein the connector plate of the alignment unit is coupled to the first chamber.

16. The apparatus of claim 14, wherein the alignment unit supports the second chamber, and wherein the connector plate of the alignment unit is coupled to the second chamber.

17. The apparatus of claim 14, wherein the alignment unit supports the first surface plate in such a way that the connector plate of the alignment unit is coupled to the first surface plate, and such that the plurality of actuators pass through the first chamber.

18. The apparatus of claim 17, further comprising a bellows that surrounds and encloses the plurality of actuators to seal the actuators and a through-opening of the first chamber.

19. The apparatus claim 14, wherein the alignment unit supports the second surface plate in such a way that the connector plate of the alignment unit is coupled to the second surface plate, and such that the plurality of actuators pass through the second chamber.

20. The apparatus according of claim 19, further comprising a bellows that surrounds the plurality of actuators to seal the actuators and a through-opening of the second chamber.

21. An apparatus for bonding substrates, comprising:
a first chamber having a first surface plate upon which a first substrate can be mounted;
a second chamber mounted opposite the first chamber, the second chamber having a second surface plate upon which a second substrate can be mounted;

an alignment unit installed on at least one of the first surface plate and the second surface plate, wherein the alignment unit can adjust a position of a substrate mounted on the surface plate to which it is attached via a six-degrees-of-freedom alignment procedure, a plurality of first chuck plates coupled to the first surface plate; and a plurality of first chucks mounted on corresponding ones of the first chuck plates, wherein the first chucks can hold a substrate, wherein the alignment unit comprises a plurality of first alignment units, wherein each first alignment unit is mounted between one of the first chuck plates and the first surface plate such that a connector plate of each first alignment unit is coupled to a first chuck plate and a support plate of each first alignment unit is coupled to the first surface plate, and each first alignment unit includes an actuator installed between the connector plate and the support plate, wherein a first end of each of the actuators is pivotally coupled to the connector plate, and wherein a second end of each of the actuators is pivotally coupled to the support plate.

22. The apparatus of claim 21, further comprising:

a plurality of second chuck plates that are coupled to the second surface plate; and a plurality of second chucks mounted on corresponding ones of the second chuck plates, wherein the second chucks can hold a substrate.

23. The apparatus of claim 22, wherein the alignment unit further comprises a plurality of second alignment units, and wherein each second alignment unit is mounted between one of the second chuck plates and the second surface plate such that the connector plate of each second alignment unit is coupled to a second chuck plate and the support plate of each second alignment unit is coupled to the second surface plate.

24. The apparatus of claim 1, wherein the six-degrees-of-freedom alignment procedure include X-axis direction, Y-axis direction, Z-axis direction, roll, pitch and yaw aligning operations.

25. The apparatus of claim 14, wherein the six-degrees-of-freedom alignment procedure include X-axis direction, Y-axis direction, Z-axis direction, roll, pitch and yaw aligning operations.

26. The apparatus of claim 21, wherein the six-degrees-of-freedom alignment procedure include X-axis direction, Y-axis direction, Z-axis direction, roll, pitch and yaw aligning operations.

\* \* \* \* \*